(12) United States Patent
Hayashida et al.

(10) Patent No.: US 11,125,702 B2
(45) Date of Patent: Sep. 21, 2021

(54) RADIATION IMAGING APPARATUS, IMAGE PROCESSING APPARATUS, AND IMAGE PROCESSING METHOD

(71) Applicant: CANON KABUSHIKI KAISHA, Tokyo (JP)

(72) Inventors: Shinsuke Hayashida, Tokyo (JP); Takashi Takasaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 16/810,426

(22) Filed: Mar. 5, 2020

(65) Prior Publication Data

US 2020/0292474 A1    Sep. 17, 2020

(30) Foreign Application Priority Data

Mar. 12, 2019  (JP) .............................. JP2019-045136

(51) Int. Cl.
*G01N 23/04* (2018.01)
*G01N 23/046* (2018.01)
(Continued)

(52) U.S. Cl.
CPC ............. *G01N 23/046* (2013.01); *G06T 3/20* (2013.01); *G06T 11/005* (2013.01);
(Continued)

(58) Field of Classification Search
CPC ....... G01N 2223/303; G01N 2223/401; G01N 2223/425; G01N 23/04; G01N 23/046; G01N 21/645; G01N 2223/306; G01N 2223/501; G01N 2223/505; G01N 1/247; G01N 1/2928; G01N 1/17; G01N 1/026; G01N 1/15; G01N 7/005; G06T 11/005; G06T 1/20; G06T 3/20; G06T 2207/10116; G06T 2207/10016; G06T 2207/30061;
(Continued)

(56) References Cited

U.S. PATENT DOCUMENTS 8,197,137 B2   6/2012 Takasaki
8,503,607 B2   8/2013 Takasaki
(Continued)

FOREIGN PATENT DOCUMENTS

JP   2002281399 A   9/2002
JP   2007019820 A   1/2007

*Primary Examiner* — Irakli Kiknadze
(74) *Attorney, Agent, or Firm* — Venable LLP (57) ABSTRACT

An image processing apparatus that processes an image obtained from an imaging sensor having a plurality of pixels arranged in a matrix pattern, the pixels including a first pixel group for obtaining a pixel value corresponding to a radiation dose and a second pixel group for obtaining an offset value even with irradiation with radiation, performs offset correction of a radiation image obtained from the plurality of pixels by an imaging operation with irradiation with radiation based on a dark image obtained from the plurality of pixels by an imaging operation without irradiation with radiation, calculates a statistic value of pixel values obtained from the second pixel group of the corrected radiation image, and corrects pixel values obtained from the first pixel group, which have been offset-corrected, based on a temporal variation in the statistic value.

17 Claims, 8 Drawing Sheets

(51) Int. Cl.
*G06T 3/20* (2006.01)
*G06T 11/00* (2006.01)

(52) U.S. Cl.
CPC . *G01N 2223/303* (2013.01); *G01N 2223/401* (2013.01); *G01N 2223/425* (2013.01)

(58) Field of Classification Search
CPC . G06T 7/0016; G06T 2200/24; G06T 7/0014; G06T 2207/20021; G06T 5/40; G06T 5/50; G06T 7/0012; G06T 11/00; G06T 11/008; G06T 11/60; G06T 2207/20012; G06T 2207/20182; G06T 2207/30008; G06T 2207/30104; G06T 5/008; G06T 7/20; G06T 2207/20224; G06T 2207/30004; G06T 5/002; G06T 5/005; G06T 5/10; G06T 5/20; G06T 2207/20024; A61B 6/08; A61B 6/107; A61B 6/542; A61B 6/547; A61B 6/587; A61B 6/4233; A61B 6/585; A61B 6/032; A61B 6/4283; A61B 6/5217; A61B 6/5258; A61B 6/463; A61B 6/54; A61B 5/055; A61B 5/113; A61B 6/037; A61B 6/4035; A61B 6/4291; A61B 6/50; A61B 6/5205; A61B 6/5235; A61B 6/563; A61B 6/583; A61B 2034/105; A61B 2560/0204; A61B 2560/0266; A61B 6/5211; A61B 6/548; A61B 6/487; A61B 6/00; A61B 6/4208; A61B 6/4225; A61B 6/5252; G01T 1/247; G01T 1/2018; G01T 1/17; G01T 1/20; G01T 1/24; G01T 1/1647; G01T 7/005; G01T 1/023; G01T 1/15; G01T 1/16; G01T 1/2006; G01T 1/026; G01T 1/2928; H04N 5/32; H04N 5/378; H04N 5/361; H04N 5/357; H04N 5/3651; H04N 5/3658; H04N 5/367; H04N 5/369; H04N 5/379; H04N 5/374; H04N 5/2353; H04N 5/341; H04N 5/363; H04N 5/3653; H04N 5/3655; H04N 5/3745; H04N 5/37452; H04N 5/3765; H04N 3/155; H04N 5/3205; H04N 5/35572; H04N 5/3559; H04N 5/3575; H01L 27/14612; H01L 27/14625; H01L 27/14643; H01L 27/14658; H01L 27/14609; H01L 27/14627; H01L 27/14676; H01L 21/8221; H01L 21/8232; H01L 27/0688; H01L 27/088; H01L 27/14; H01L 27/14623; H01L 27/14634; H01L 27/14641; H01L 27/14645; H01L 27/14649; H01L 27/14663; H01L 31/115; H05G 1/42; H05G 1/52; H05G 1/30; H05G 1/32; H05G 1/34; H05G 1/38; H05G 1/44; H05G 1/56; A61N 5/1039; A61N 5/1071; A61N 2005/1034; A61N 2005/1054; A61N 2005/1061; A61N 5/1031; A61N 5/1065; A61N 5/1075; A61N 5/1081; A61N 1/1071; G01J 1/44; G01J 2001/442; G01J 2001/4466; G06K 9/2054; G06K 9/36; G06K 9/4642; G06K 9/60; G06K 9/6212; G06K 9/78; G06K 9/80; G16H 50/20; G03B 42/02
USPC .................. 378/62, 64, 97.8–97.12
See application file for complete search history.

(56) References Cited

U.S. PATENT DOCUMENTS

| | | | |
|---|---|---|---|
| 9,014,461 B2 | 4/2015 | Hayashida | |
| 10,245,003 B2 | 4/2019 | Hayashida | |
| 2012/0020541 A1 | 1/2012 | Hayashida | |
| 2015/0055752 A1* | 2/2015 | Takahashi | H04N 5/32 378/62 |
| 2015/0139390 A1* | 5/2015 | Bellazzini | G01T 1/17 378/62 |
| 2016/0178764 A1* | 6/2016 | Ryu | G01T 1/247 250/370.08 |
| 2016/0350923 A1* | 12/2016 | Muraoka | G06T 5/008 |
| 2019/0324163 A1* | 10/2019 | Taguchi | G01T 7/005 |
| 2020/0096654 A1* | 3/2020 | Saito | H04N 5/32 |

* cited by examiner

IMMEDIATELY AFTER
START OF IMAGING

FIG. 7B

ONE HOUR AFTER
START OF IMAGING

RADIATION IMAGING APPARATUS, IMAGE PROCESSING APPARATUS, AND IMAGE PROCESSING METHOD

BACKGROUND OF THE INVENTION

Field of the Invention

The present invention relates to a radiation imaging apparatus using a solid-state imaging device, an image processing apparatus, and an image processing method.

Description of the Related Art

As a radiation imaging apparatus used for medical image diagnosis and non-destructive inspection using radiation such as X-rays, a radiation imaging apparatus having pixels as combinations of switches such as TFTs (thin-film transistors) and conversion elements such as photoelectric conversion elements arranged in a matrix pattern has been put into practice. In such a type of radiation imaging apparatus, manufacturing variations, environmental variations such as temperature variations, and the like cause variations in the value of an output without any irradiation (that is, an offset output) for each pixel. Accordingly, offset correction is performed to correct these variations.

As one method of performing the above offset correction, a method of calculating the difference between an offset signal (offset image) and an output at the time of imaging is used. This offset signal is obtained by obtaining a plurality of images without irradiation with radiation before imaging and calculating the average value of the resultant pixel values. This offset correction method need not obtain any offset image before and after radiation imaging, and hence is suitable for high-speed imaging such as moving-image imaging that requires a high frame rate. In addition, because an offset image is generated from a plurality of obtained images, this method has an advantage in reducing noise in the offset image.

Japanese Patent Laid-Open No. 2007-019820 (to be referred to as patent literature 1) discloses a method of providing each pixel with an optical black pixel that is light-shielded to obtain an offset signal in addition to a photoelectric conversion element for obtaining a radiation signal and using an output from the optical black pixel. Patent literature 1 discloses a radiation detection apparatus having a function of grasping the shading of an offset signal in an effective pixel region from outputs from optical black pixels in an effective pixel region and suppressing shading caused in an image obtained from the effective pixel region.

In the above offset correction method, a time difference occurs between the time of obtaining an offset image and the time of imaging, and the time difference causes a temperature distribution having a temperature difference between a region near a heating element in the apparatus and a region remote from the heating element. This temperature distribution changes an offset output, and hence an offset value shifts in the pixel matrix plane. This shift is visually recognized as an image artifact. In recent years, there has been a trend toward thinner and lighter radiation imaging apparatuses. This tends to increase the influence of heating elements such as a power supply and a high-density electrical component in the radiation imaging apparatus housing. Patent literature 1 makes some reference to offset correction of shading but makes no reference to a temporal change in offset components like that described above.

SUMMARY OF THE INVENTION

The present invention provides a technique of reducing a deterioration in image quality caused by a temporal change in offset component caused during imaging in a radiation imaging apparatus.

According to one aspect of the present invention, there is provided an image processing apparatus that processes an image obtained from an imaging sensor having a plurality of pixels arranged in a matrix pattern, the pixels including a first pixel group for obtaining a pixel value corresponding to a radiation dose and a second pixel group for obtaining an offset value even with irradiation with radiation, the apparatus comprising: a first correction unit configured to perform offset correction of a radiation image obtained from the plurality of pixels by an imaging operation with irradiation with radiation based on a dark image obtained from the plurality of pixels by an imaging operation without irradiation with radiation; a calculation unit configured to calculate a statistic value of pixel values obtained from the second pixel group of the radiation image corrected by the first correction unit; and a second correction unit configured to correct pixel values obtained from the first pixel group, which are corrected by the first correction unit, based on a temporal variation in the statistic value obtained by the calculation unit.

According to another aspect of the present invention, there is provided a radiation imaging apparatus comprising: an imaging sensor having a plurality of pixels arranged in a matrix pattern, the pixels including a first pixel group for obtaining a pixel value corresponding to a radiation dose and a second pixel group for obtaining an offset value even with irradiation with radiation; and an image processing apparatus configured to process an image obtained from the imaging sensor, wherein the image processing apparatus includes a first correction unit configured to perform offset correction of a radiation image obtained from the plurality of pixels by an imaging operation with irradiation with radiation based on a dark image obtained from the plurality of pixels by an imaging operation without irradiation with radiation, a calculation unit configured to calculate a statistic value of pixel values obtained from the second pixel group of the radiation image corrected by the first correction unit, and a second correction unit configured to correct pixel values obtained from the first pixel group, which are corrected by the first correction unit, based on a temporal variation in the statistic value obtained by the calculation unit.

According to another aspect of the present invention, there is provided an image processing method for processing an image obtained from an imaging sensor having a plurality of pixels arranged in a matrix pattern, the pixels including a first pixel group for obtaining a pixel value corresponding to a radiation dose and a second pixel group for obtaining an offset value even with irradiation with radiation, the method comprising: executing first correction processing of performing offset correction of a radiation image obtained from the plurality of pixels by an imaging operation with irradiation with radiation by using an offset image based on a dark image obtained from the plurality of pixels by an imaging operation without irradiation with radiation; calculating a statistic value of pixel values obtained from the second pixel group of the radiation image corrected by the first correction processing; and executing second correction processing of correcting pixel values obtained from the first pixel group, corrected by the first correction, based on a temporal variation in the statistic value.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Each embodiment of the present invention will exemplify a case in which an X-ray imaging apparatus that images an object by using X-rays as one type of radiation is used as a radiation imaging apparatus according to the present invention. Note that the present invention is not limited to an X-ray imaging apparatus and can be applied to a radiation imaging apparatus that images an object by using other types of radiation (for example, α-rays, β-rays, and γ-rays).

First Embodiment

Figure 1:
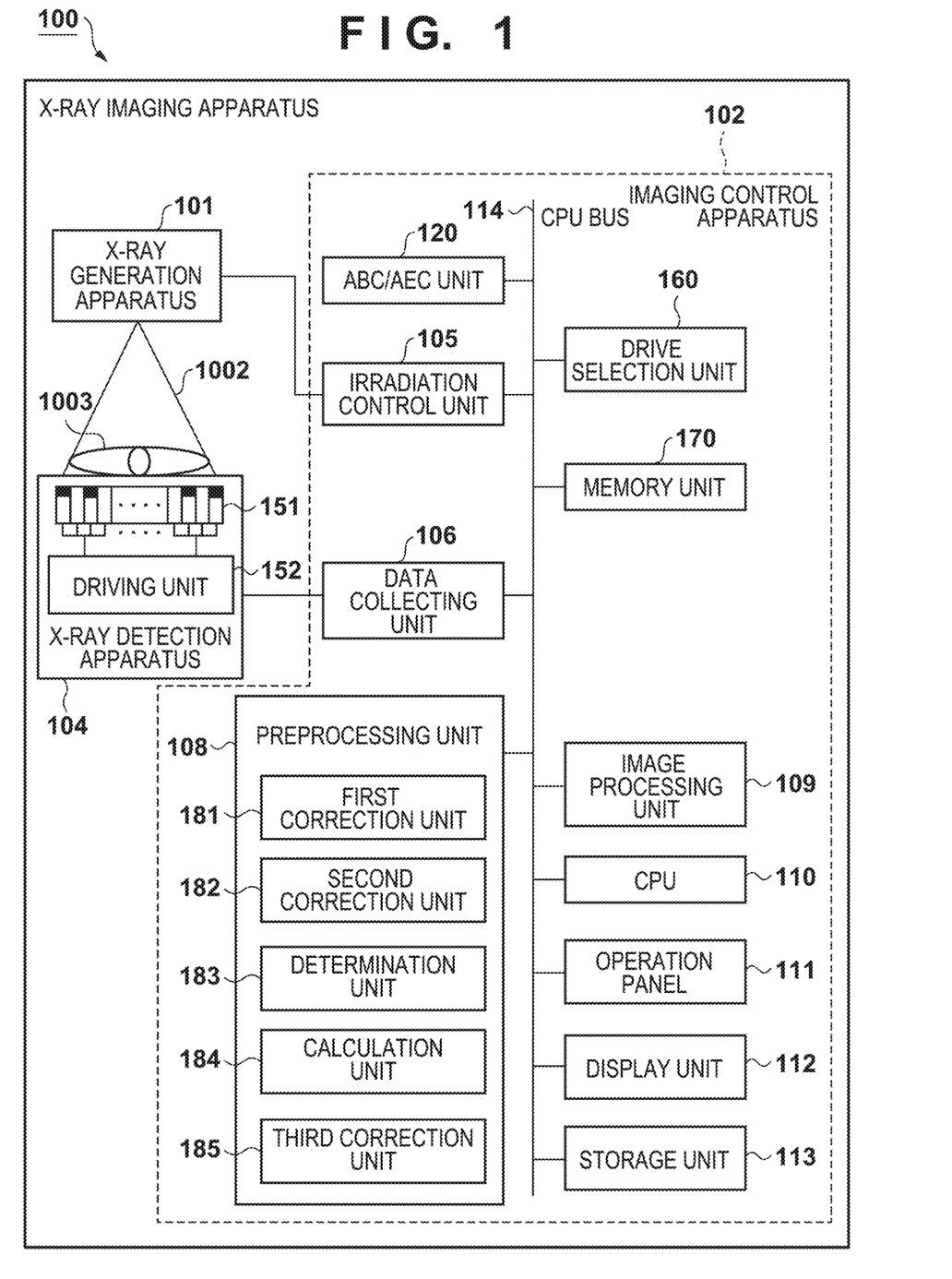
FIG. 1 is a block diagram showing an example of the arrangement of an X-ray imaging apparatus.

FIG. 1 shows the overall arrangement of an X-ray imaging apparatus 100 as an example of a radiation imaging apparatus according to the first embodiment. The X-ray imaging apparatus 100 is for medical use. The X-ray imaging apparatus 100 includes an X-ray generation apparatus 101, an X-ray detection apparatus 104, and an imaging control apparatus 102. Users such as medical care personnel (to be simply referred to as a user hereinafter) set imaging conditions via an operation panel 111 of the imaging control apparatus 102. The imaging control apparatus 102 including a CPU 110 and a storage unit 113 sets the set imaging conditions in the X-ray generation apparatus 101 and the X-ray detection apparatus 104. The X-ray generation apparatus 101 irradiates an object 1003 with X-rays 1002. The object 1003 is, for example, the human body. The X-ray detection apparatus 104 includes an imaging sensor 151 and generates X-ray image data and an offset signal. The imaging sensor 151 is, for example, an FPD (Flat Panel Detector) having many pixels arranged on a large flat wafer. A driving unit 152 drives the imaging sensor 151 to read out a signal from each pixel and output image data (radiation image).

Figure 4:
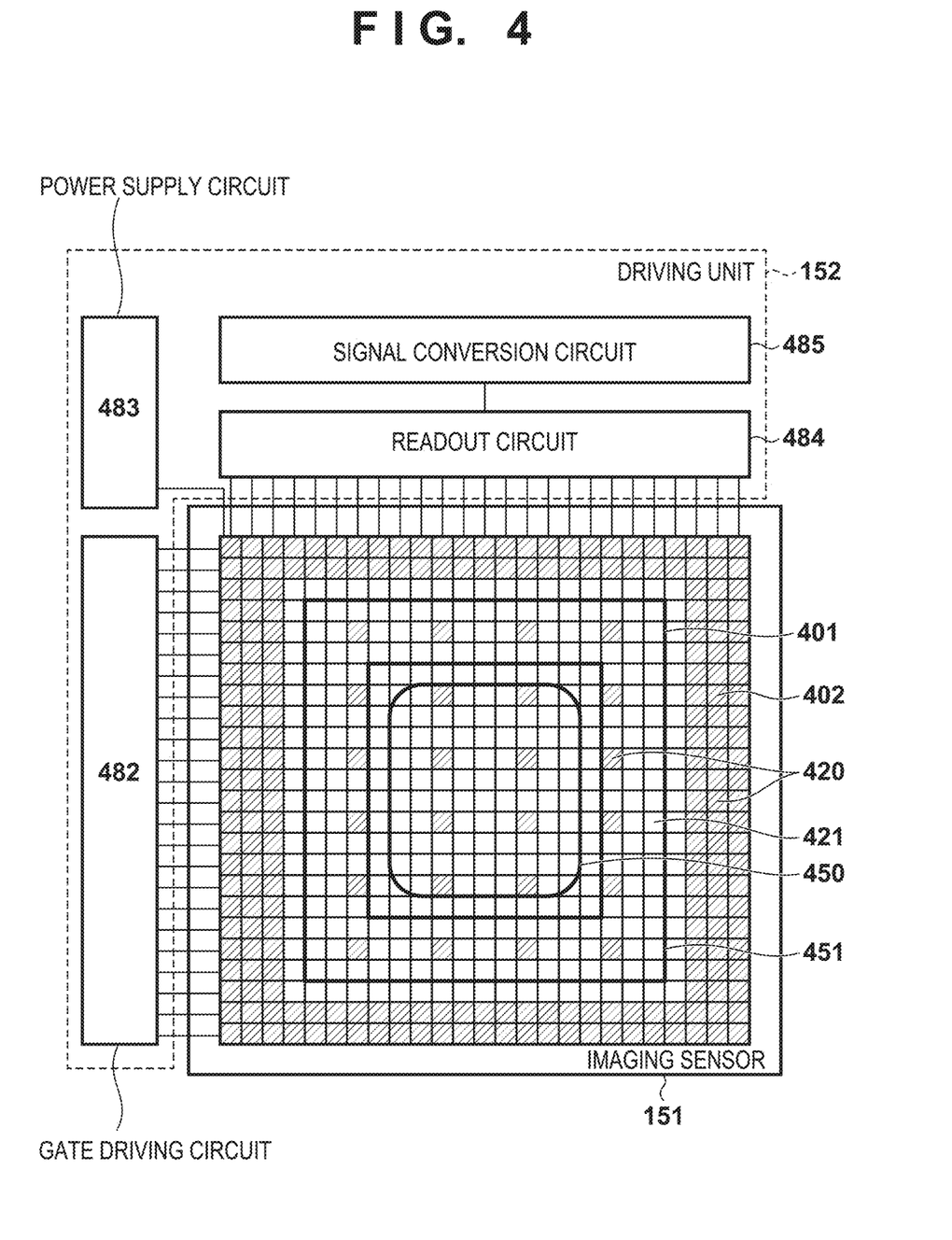
FIG. 4 is a view for explaining an example of the arrangement of an X-ray detection apparatus.

FIG. 4 shows an example of the arrangement of the X-ray detection apparatus 104. As described above, the X-ray detection apparatus 104 includes the imaging sensor 151 and the driving unit 152. The imaging sensor 151 includes a detection panel having a plurality of pixels arranged in a matrix pattern. The plurality of pixels include a first pixel group for obtaining pixel values corresponding to radiation doses and a second pixel group for also obtaining offset values with irradiation with radiation. The driving unit 152 includes a gate driving circuit 482, a power supply circuit 483, a readout circuit 484, and a signal conversion circuit 485. These circuits will be described in more detail below.

An effective pixel region 401 of the imaging sensor 151 has about 3000 row×3000 column photoelectric conversion elements arrayed two-dimensionally. The imaging sensor 151 detects the two-dimensional distribution of X-ray doses reaching the effective pixel region 401, and generates X-ray image data. Photoelectric conversion elements that are not light-shielded (to be referred to as effective elements 421 hereinafter) in the effective pixel region 401 constitute the first pixel group described above. An ineffective pixel region 402 is provided around the effective pixel region 401. The ineffective pixel region 402 contains photoelectric conversion elements provided with light-shielding members (to be referred to as light shielded elements 420 hereinafter). Note that the light shielded elements 420 may exist in the effective pixel region 401. The light shielded elements 420 constitute the second pixel group described above. Note that all the photoelectric conversion elements in the ineffective pixel region 402 may be the light shielded elements 420. As shown in FIG. 4, the light shielded elements 420 can be provided in the effective pixel region 401. The light shielded elements 420 detect offset signals contained in the X-ray image data generated by the X-ray detection apparatus 104.

At the time of moving-image imaging, binning readout, that is, collectively reading out a plurality of pixels, is sometimes performed. For example, in the case of 3×3 binning, the overall image size is about 1000 rows×1000 columns. In the case of moving-image imaging, an X-ray irradiation range 450 is sometimes set to be narrower than the effective pixel region 401. In moving-image imaging, because radiation doses are accumulated after long-time irradiation with radiation, the exposure dose is reduced by spatially narrowing down the aperture. It is possible to achieve a higher frame rate and power saving by not only performing full readout driving but also limiting the drive of the imaging sensor 151 in accordance with the range including a trimming drive range 451 set in advance by the operation panel 111.

In order to read out a signal from each pixel, the gate driving circuit 482 selectively drives a row in the matrix constituted by the plurality of pixels of the imaging sensor 151. The readout circuit 484 reads out analog signals from effective elements 421 and the light shielded elements 420 which are connected to the row selected and driven by the gate driving circuit 482, and transmits the signals to the signal conversion circuit 485. The readout circuit 484 includes an amplifier for amplifying analog signals output from the effective elements 421 and the light shielded elements 420. The signal conversion circuit 485 includes an A/D converter for converting the analog signals amplified by the readout circuit 484 into digital signals. The X-ray detection apparatus 104 transmits the digital signal obtained by the driving unit 152 to an information processing apparatus. The amplifier and the A/D converter are examples of heat generating members in the X-ray detection apparatus 104.

Referring back to FIG. 1, phosphors convert the X-rays 1002 that have entered the X-ray detection apparatus 104 into visible light. The effective elements 421 photoelectrically convert the visible light into electrical signals. The light shielded element 420 includes a light-shielding member such as a metal member which is located between the phosphor and the photoelectric conversion element and light-shields a part of the adjacent pixel. X-rays and visible light applied to the light shielded element 420 do not reach the photoelectric conversion element. The X-ray image obtained by the X-ray detection apparatus 104 in the above manner is transmitted to a data collecting unit 106 of the imaging control apparatus 102.

The imaging control apparatus 102 can be constituted by an information processing apparatus such as a personal computer. An irradiation control unit 105 controls irradiation with X-rays by the X-ray generation apparatus 101. The data collecting unit 106 receives an X-ray image transmitted from the X-ray detection apparatus 104. A preprocessing unit 108 performs, for example, offset correction processing of an X-ray image received from the X-ray detection apparatus 104 by the data collecting unit 106. The operation of each unit of the preprocessing unit 108 will be described later with reference to the flowchart of FIG. 2. An image processing unit 109 generates a diagnosis image by performing QA processing such as gradation processing and highlighting processing with respect to the X-ray image preprocessed by the preprocessing unit 108. The CPU 110 implements the respective functional units of the imaging control apparatus 102 (the preprocessing unit 108, the image processing unit 109, the irradiation control unit 105, the data collecting unit 106, an ABC/AEC unit 120, and the like) by executing predetermined programs stored in the storage unit 113. The operation panel 111 accepts various types of user operations. A display unit 112 performs various types of display under the control of the CPU 110. For example, the display unit 112 displays the diagnosis image generated by the image processing unit 109. The storage unit 113 stores various types of programs executed by the CPU 110.

The X-ray image preprocessed by the preprocessing unit 108 is also transmitted to the ABC/AEC unit 120. ABC stands for "Auto Brightness Control". AEC stands for "Auto Exposure Control". It is possible to make setting in advance via the operation panel 111 to stop irradiation by the X-ray generation apparatus 101 at a predetermined X-ray dose. The AEC function of the ABC/AEC unit 120 stops irradiation with X-rays by the X-ray generation apparatus 101 by sending an exposure permission end signal to the irradiation control unit 105 upon determining from an image signal that the X-ray dose has exceeded a predetermined X-ray dose. Alternatively, it is possible to make setting in the ABC/AEC unit 120 in advance via the operation panel 111 to stop irradiation by the X-ray generation apparatus 101 when a predetermined luminance is obtained. The ABC/AEC unit 120 stops irradiation with X-rays by the X-ray generation apparatus 101 by sending an exposure permission end signal to the irradiation control unit 105 upon determining that the luminance of an image signal has exceeded a set luminance. In this manner, the irradiation dose of X-rays is properly controlled.

Although FIG. 1 shows the case in which the preprocessing unit 108 is mounted outside the X-ray detection apparatus 104, the preprocessing unit 108 may be mounted inside the X-ray detection apparatus 104. A merit in mounting the preprocessing unit 108 outside the X-ray detection apparatus 104 is to allow a memory unit 170 and the storage unit 113 to have larger capacities, because a sufficient space can be secured, and hence to be able to implement image saving for preprocessing and perform sequential correction processing. In contrast to this, a merit in mounting the preprocessing unit 108 inside the X-ray detection apparatus 104 is to be able to handle signals simply by executing preprocessing in the X-ray detection apparatus 104 because only appropriate signals after the processing need to be handled on the subsequent stage. In addition, because an X-ray image after correction is transmitted, the X-ray image can be transferred after being compressed. This can reduce the load on communication. Note that some units of the preprocessing unit 108 may be mounted inside the X-ray detection apparatus 104, and the remaining units may be mounted outside the X-ray detection apparatus 104.

The respective functional units such as the preprocessing unit 108 and the image processing unit 109 may be implemented by causing the CPU 110 to execute programs stored in the storage unit 113, may be implemented by dedicated hardware, or may be implemented by cooperation between programs and hardware. In addition, other functional units of the preprocessing unit 108 may be implemented either inside or outside the imaging control apparatus 102. For example, the ABC/AEC unit 120 may be implemented as an FPGA (Field-Programmable Gate Array) inside the X-ray detection apparatus 104.

Figure 2:
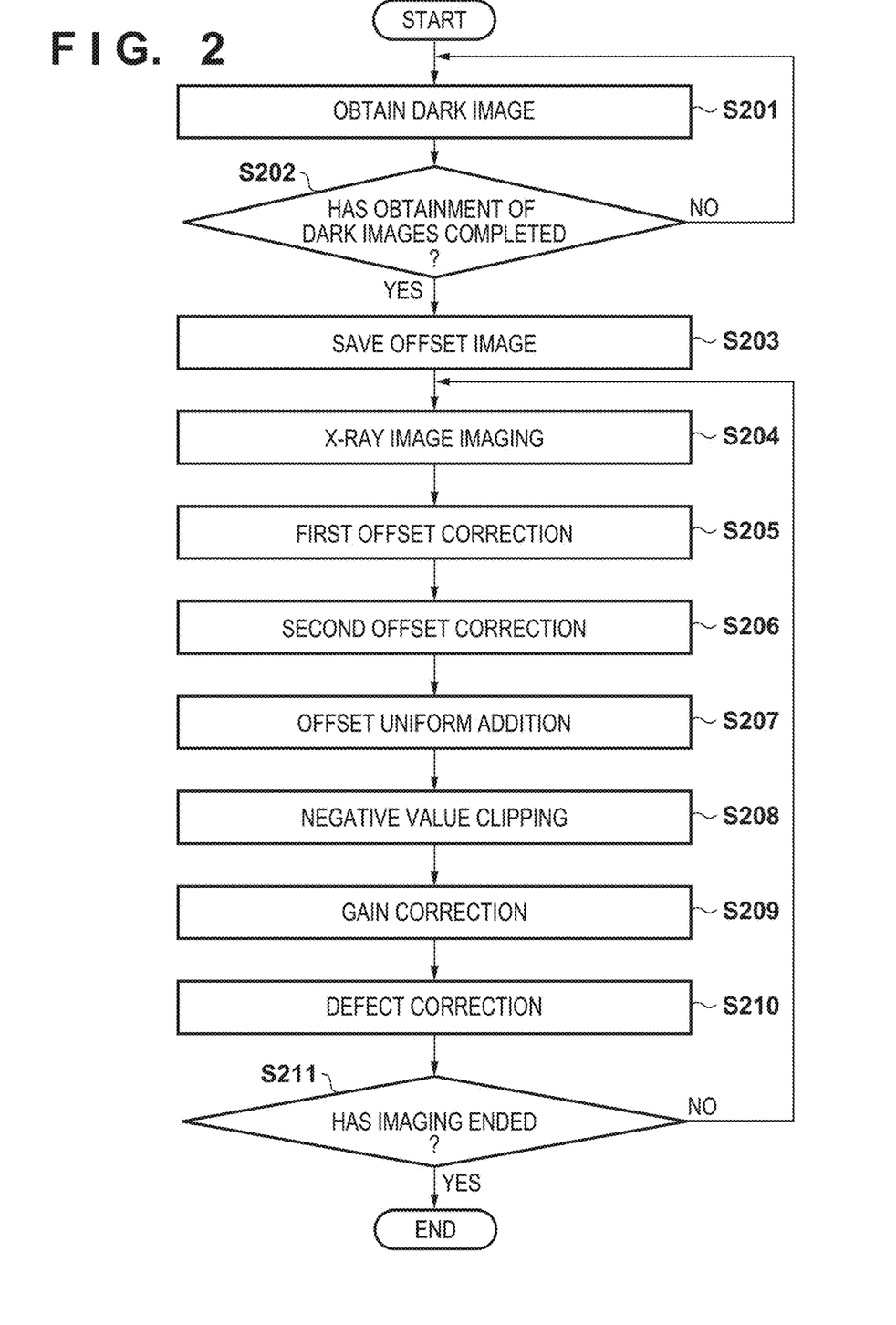
FIG. 2 is a flowchart showing an example of X-ray imaging processing.

An operation from the start of imaging an object to the end of preprocessing by the preprocessing unit 108 according to the first embodiment will be described below with reference to the flowchart of FIG. 2. A first correction unit 181 uses the dark image obtained from a plurality of pixels obtained by an imaging operation without irradiation with radiation to perform offset correction of the radiation image obtained from the plurality of pixels obtained by an imaging operation with irradiation with radiation (first offset correction).

First of all, the first correction unit 181 obtains a dark image by executing an imaging operation using the X-ray detection apparatus 104 without irradiation with radiation before an object imaging operation to generate an offset image used for the first offset correction (step S201). The obtained dark image is saved in the memory unit 170. Upon obtaining a predetermined number of dark images (step S202), the first correction unit 181 averages the obtained dark images and saves the resultant image as an offset image in the memory unit 170 (step S203). In this manner, the first correction unit 181 performs the first offset correction by using the image obtained by averaging a predetermined number of dark images as an offset image. For example, the first correction unit 181 obtains an offset image by averaging 32 dark images. Note that the obtained offset image contains offset correction values for the pixel values obtained from the light shielded elements 420.

It is necessary to complete generating an offset image in steps S201 to S203 before the start of X-ray imaging. The first correction unit 181 performs control so as to cause the display unit 112 to display a message such as "activating" to inhibit the operator from performing X-ray imaging while the obtaining of a predetermined number of dark images and the generation of an offset image are completed. The obtained offset image is saved in the memory unit 170. In addition, during "activating" described above (during the execution of steps S201 to S203), a third correction unit 185 loads a gain image used for gain correction and a defect map used for defect correction from the X-ray detection apparatus 104 and save them in the memory unit 170.

When the obtaining of an offset image is completed, target X-ray imaging can be performed, and the operator starts obtaining an X-ray image. When X-ray imaging is executed, the X-ray image obtained by the imaging is transmitted from the data collecting unit 106 to the preprocessing unit 108 (step S204), and preprocessing in and after step S205 is executed.

The first correction unit 181 performs first offset correction of an X-ray image by using the offset image obtained in steps S201 to S203 (step S205). A second correction unit 182, a determination unit 183, and a calculation unit 184 perform the second offset correction of the X-ray image having undergone the first offset correction (step S206). The second offset correction will be described in detail later with reference to the flowchart of FIG. 3.

The third correction unit 185 performs offset uniform addition (step S207). Performing this offset uniform addition makes it possible to suppress the occurrence of negative values caused by local drops in value in an image having a portion difficult to handle by offset correction using statistic processing based on outputs from photoelectric conversion elements. In this processing, for example, an offset value of about 50 LSBs is uniformly added. This technique has the merit of reducing the probability of occurrence of negative values as the offset value to be added increases. In contrast to this, as the offset value to be added increases, when the preprocessing unit 108 or the image processing unit 109 performs image processing based on the premise that when the dose is zero, the pixel value is zero, the above technique tends to have the demerit of causing an inverse image in calibration, reducing contrast, and the like. An inverse image in calibration may be caused as the pixel value becomes positive when the dose is zero. For this reason, it is preferable to uniformly add, for example, a relatively small offset value of 50 LSBs. Alternatively, the user may select an offset value to be uniformly added based on, for example, the method used in a clinical case. Note that offset uniform addition is an option and may be omitted.

The third correction unit 185 performs negative value clipping (step S208). In negative value clipping, the third correction unit 185 clips each pixel having a negative value or 0 as a pixel value to a minimum fixed value such as 1 LSB as a pixel value. When, for example, the preprocessing unit 108 or the image processing unit 109 uses division, a denominator including a pixel value of 0 may cause a trouble. In addition, in logarithmic conversion of a pixel value, a negative value may cause a trouble. Accordingly, negative value clipping is performed to fix a negative pixel value or a pixel value of 0 to 1 LSB. In this embodiment, before the execution of this negative value clipping, the second offset processing (step S206) and offset uniform addition (step S207) are performed to reduce the number of pixel values that become negative values. Performing these processes will reduce the possibility of pixel values being negative values in an image region having distribution information transmitted through an object.

The third correction unit 185 performs gain correction by using a gain image saved in the memory unit 170 (step S209). In general, gain correction is performed by using division or subtraction after logarithmic conversion. The third correction unit 185 performs defect correction by using the defect map saved in the memory unit 170 (step S210). Note that a known method can be used for such gain correction and defect correction.

The CPU 110 checks the state of the operation panel 111 and determines whether to continue exposure (step S211). When finishing imaging, the CPU 110 simultaneously finishes exposure by the X-ray generation apparatus 101. At the time of tomographic imaging, the computer determines the continuation of imaging based on an imaging instruction saved in the storage unit 113 in advance instead of checking the state of the operation panel 111. If the preprocessing unit 108 determines whether to finish imaging and determines not to finish imaging, the process returns to step S203 to perform the above processing for a next X-ray image (NO in step S211). Upon determining to finish X-ray imaging, the CPU 110 terminates this processing (YES in step S211).

Figure 3:
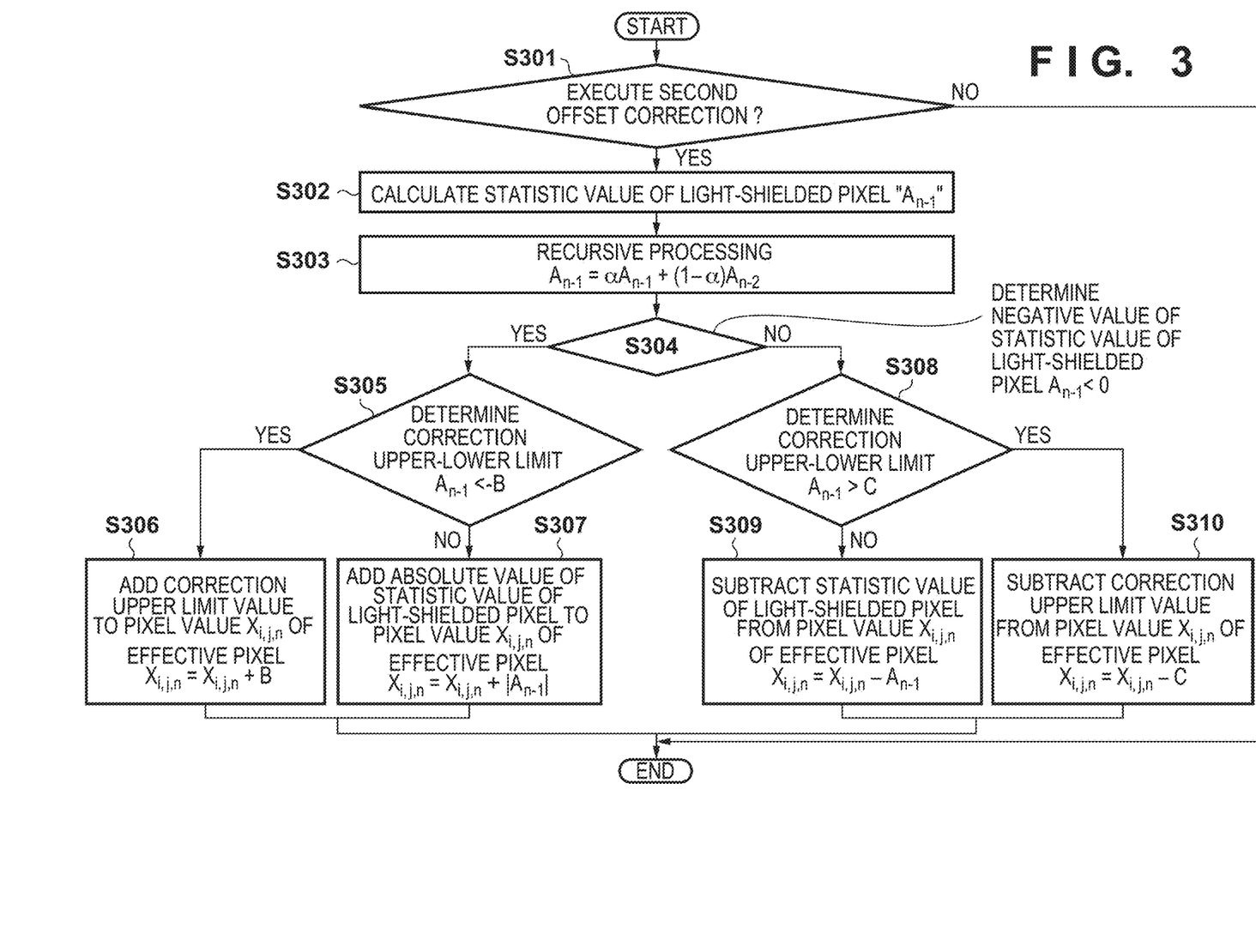
FIG. 3 is a flowchart showing an example of the second offset correction processing.

The second offset correction in step S206 will be described next. FIG. 3 is a flowchart for explaining the second offset correction processing according to the first embodiment.

In still-image imaging or the like, it is possible to perform the first offset correction by calculating differences between the data obtained by imaging with irradiation with radiation and the data obtained by imaging without irradiation with radiation for each imaging operation. That is, in still-image imaging, because the offset image obtained at a timing near imaging can be used, the necessity of the second offset correction processing according to this embodiment is low. In high-speed imaging such as moving-image imaging, in order to secure a high frame rate, the first offset correction is performed by repeatedly using the offset image obtained in steps S201 and S202 during moving-image imaging. That is, offset correction is performed by obtaining a plurality of images without irradiation with radiation before moving-image imaging, holding the average value of the resultant values as an offset image, and calculating the difference between an output at the time of moving-image imaging and the offset image.

Moving-image imaging is generally performed with a low radiation dose. The above first offset correction is advantageous in reducing noise by generating an offset image using a plurality of dark images. In contrast to this, in moving-image imaging, there is a time difference between the time of obtaining an offset image and the time of imaging. This time difference causes a temperature distribution including different temperatures in a region near a heating element in the apparatus and a region remote from the heating element. Changes in temperature will change an offset output. For this reason, as the imaging time prolongs, an offset value shifts within a plane due to a temperature distribution, resulting in image artifacts. The second correction unit 182 reduces offset value shifts caused by a temperature distribution by performing the second offset correction processing.

First of all, the determination unit 183 determines whether to perform the second offset correction processing (step S301). As described above, as the elapsed time since the time of obtaining an image for the first offset correction increases, the temperature distribution changes from the time of obtaining the first offset image, resulting in a different offset output distribution. Accordingly, the determination unit 183 determines whether to execute the second offset correction, based on the value of a temperature sensor provided on an electric board in the X-ray detection apparatus 104 or the elapsed time since the time of obtaining the image.

For example, the determination unit 183 compares an output value from the temperature sensor at the time of obtaining an image for the first offset correction with an output value from the temperature sensor during imaging of an object. If these output values differ from each other by a predetermined value (for example, 2° C.) or more, the determination unit 183 determines to execute the second offset correction. If the difference is less than the predetermined value, the determination unit 183 determines not to execute the second offset correction. In addition, if, for example, the elapsed time since the time of obtaining an image for the first offset correction exceeds a predetermined value (for example, 30 min), the determination unit 183 determines to execute the second offset correction. If the elapsed time does not exceed the predetermined value, the determination unit 183 determines not to execute the second offset correction. Note that a temperature change often occurs in a short time immediately after power-on, at the start of charging, or after a change in charging rate. For this reason, at these timings, the determination unit 183 may perform determination upon changing the above time from 30 min to a short time, for example, 10 min. Note that the determination unit 183 may determine whether to execute the second offset correction processing, based on both determinations using a value from the temperature sensor and the elapsed time.

If the determination unit 183 determines to execute the second offset correction (YES in step S301), the second offset correction indicated in and after step S302 is executed. In the second offset correction, first of all, the calculation unit 184 calculates the statistic value of pixel values obtained from the second pixel group of the radiation image (X-ray image) corrected by the first correction unit 181 (step S302). The second pixel group is a pixel group constituted by the light shielded elements 420. The calculation unit 184 according to this embodiment performs recursive processing of integrating, using weighting, the statistic value obtained before the previous radiation imaging (X-ray imaging) and the statistic value obtained by current radiation imaging (X-ray imaging) to obtain a statistic value used by the second correction unit 182.

More specifically, first of all, the calculation unit 184 calculates a statistic value $A_{n-1}$ of pixel values obtained from light shielded elements by previous X-ray imaging using values from the light shielded elements after the first offset correction. As the statistic value used in step S302, for example, the average value of pixel values obtained from the light shielded elements 420 constituting the second pixel group can be used. Note that the statistic value used in step S302 may be a median value, mode value, top % value, or the like. The details of calculation of a statistic value in step S302 will be described in detail later with reference to the flowchart of FIG. 5. Note that for a correction target image (n) obtained in step S204, the statistic value $A_{n-1}$ of an immediately preceding image (n−1) is obtained in step S302. This is because a statistic value cannot be obtained in time due to limitations in terms of frame rates.

The calculation unit 184 then executes recursive processing $A_{n-1} = \alpha A_{n-1} + (1-\alpha) A_{n-2}$ (step S303). In this case, a statistic value $A_{n-2}$ is the statistic value obtained by recursive processing in the previous X-ray imaging (step S303 previously executed). Note that recursive processing is used because flicker, that is, a variation in pixel value, sometimes occurs every several frames in moving-image imaging depending on a time period, and hence the use of values from the light shielded elements 420 in a plurality of images improves the reliability. Note that a statistic value may be calculated in steps S302 and S303 regardless of the determination result obtained in step S301.

Note that a weight value $\alpha$ used in step S303 may be dynamically changed by using the elapsed time since the obtaining of an offset image or a temperature sensor output value used in step S301. For example, increasing the weight value $\alpha$ when the elapsed time since the obtaining of an image for the first offset correction is short will obtain the merit of performing proper correction at the occurrence of a rapid characteristic change. When the elapsed time is long, reducing the weight value $\alpha$ makes it possible to perform correction by using image values obtained from more imaging operations with stable characteristics. In addition, as in the above case, in correction using an output value from the temperature sensor, when a temperature change is large, increasing the weight value $\alpha$ can obtain the merit of performing proper correction at the occurrence of a rapid temperature change. When a temperature change is small, it is possible to perform correction by using image values obtained by more imaging operations while the temperature is stable.

The determination unit 183 performs positive/negative determination of the statistic value $An_{n-1}$ of light shielded elements (step S304). The statistic value $A_{n-1}$ sometimes becomes a negative value as a result of the first offset correction. That a statistic value from light shielded elements becomes negative indicates that when the radiation dose is low, in particular, negative values occur in many pixels, and an image signal of an object is cut to a predetermined value in subsequent negative value clipping (step S208). When the statistic value $A_{n-1}$ is positive, a low-contrast image may be obtained as a result of performing image processing based on the premise that a pixel value without irradiation with X-rays is 0. If the statistic value $A_{n-1}$ of values from light shielded elements is negative, the process advances to step S305. If the statistic value is positive, the process advances to step S308. Note that if the statistic value $A_{n-1}$ is 0 (zero), the process may advance to either step S305 or step S309.

Based on the statistic value, the second correction unit 182 performs offset correction of the pixel values obtained from the first pixel group (effective elements 421) of the radiation image (X-ray image) corrected by the first correction unit 181. The operation of the second correction unit 182 will be described in detail with reference to steps S305 to S310. Note that in this embodiment, if the absolute value of a statistic value is larger than a predetermined threshold, the second offset correction is executed by using the threshold. If the absolute value of a statistic value is equal to or less than the predetermined threshold, the second offset correction is executed by using the statistic value.

If the value of the statistic value $A_{n-1}$ is negative, the second correction unit 182 determines whether the absolute value of the statistic value $A_{n-1}$ is larger than a predetermined threshold B (B>0) (step S305). If the absolute value of the statistic value $A_{n-1}$ is larger than the threshold B ($|A_{n-1}|>B$, that is, $A_{n-1}<-B$), some kind of abnormality such as wiring disconnection may have occurred.

If statistic value $A_{n-1}<-B$ (YES in step S305), the second correction unit 182 adds B as a limiter value to the pixel values of all the effective pixels (step S306). This serves as a predetermined limiter with respect to the influence on an overall image even if abnormality has occurred in part of the image. If statistic value $A_{n-1} \geq -B$ (NO in step S305), the second correction unit 182 determines that the value of the statistic value $A_{n-1}$ falls within a proper range. The second correction unit 182 then uniformly adds the absolute value of the statistic value $A_{n-31\ 1}$ to all effective pixels (step S307).

Upon determining in step S304 that the statistic value $A_{n-1}$ is 0 or positive, the second correction unit 182 determines whether the statistic value $A_{n-1}$ is larger than a predetermined threshold C (step S308). If the positive value is larger than the threshold by a predetermined value or more, some kind of abnormality such as disconnection may have occurred. If the statistic value $An_{n-1}$ is larger than the threshold C, the process advances to step S310. If the statistic value $A_{n-1}$ is equal to or less than the threshold C, the process advances to step S309.

If the statistic value $A_{n-1}$ is equal to or less than the threshold C (NO in step S308), the second correction unit 182 determines that the statistic value $A_{n-1}$ falls within the proper range, and uniformly subtracts the statistic value $A_{n-1}$ from all the effective pixels (step S309). If the statistic value $A_{n-1}$ is larger than the threshold C (YES in step S308), the second correction unit 182 subtracts C, which is a limiter value, from all the effective pixels (step S310). This operation serves as a certain kind of limiter when, for example, abnormality has occurred in part of the image with respect to the influence of the abnormality on an overall image.

Note that steps S308 to S310 may be omitted from the flowchart of FIG. 3 which explains the second offset correction. In this case, only when the statistic value $A_{n-1}$ is smaller than a predetermined threshold (in this case, the statistic value $A_{n-1}$ is a negative value), the determination unit 183 determines to execute the second offset correction. This arrangement has the merit of being able to suppress the clipping of an image with a low radiation dose and simplifying the arrangement.

If the calculation of a statistic value $A_n$ obtained from a currently obtained image (n) in step S302 can be done in time for recursive processing in step S303, the statistic value $A_n$ may be used. In this case, $A_{n-1}$ in steps S302 to S305 and steps S307 to S309 may be read as $A_n$, and $A_{n-2}$ in step S303 may be read as $A_{n-1}$. In addition, the statistic value to be obtained in step S302 may be switched between $A_n$ and $A_{n-1}$ depending on the frame rate of a moving image. That is, control may be performed in step S302 such that if the frame rate is higher than a predetermined value, the statistic value $A_{n-1}$ is obtained, whereas if the frame rate is equal to or less than the predetermined value, the statistic value $A_n$ is obtained.

Figure 5:
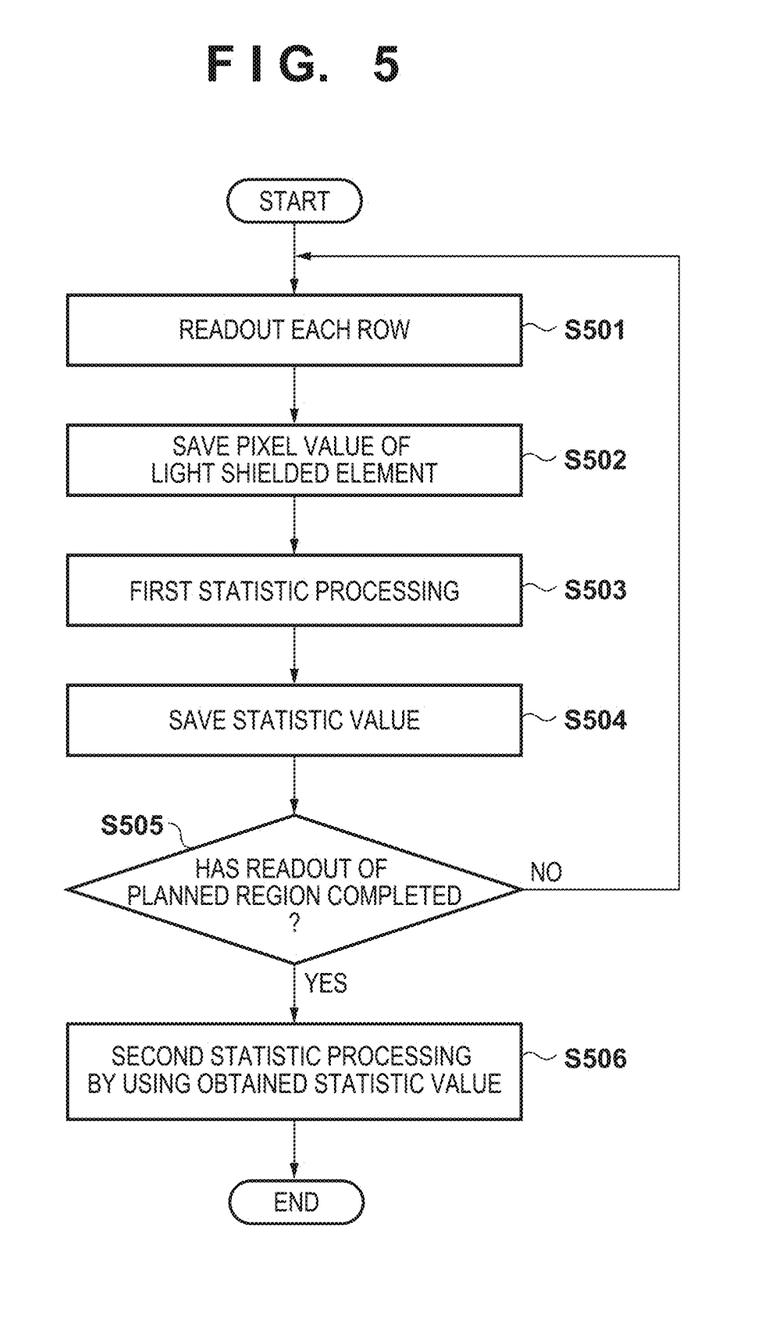
FIG. 5 is a flowchart showing statistic processing of pixel values obtained from light shielded elements.

FIG. 5 is a flowchart for explaining statistic processing by the calculation unit 184. Note that the calculation unit 184 performs statistic processing described below by using the image saved in the memory unit 170 and having undergone the first offset correction. However, this is not exhaustive. Statistic processing is executed during moving-image imaging and hence may be executed concurrently with the readout operation of the readout circuit 484. In this case, the first offset correction and statistic processing are executed for each row. Note that the X-ray detection apparatus 104 may execute statistic processing by using, for example, an FPGA. If most processing to be executed by the preprocessing unit 108 is executed inside the X-ray detection apparatus 104, for example, information from the second pixel group need not be transferred to the imaging control apparatus 102. This enables efficient transfer. It is also obvious to those skilled in the art that providing the calculation unit 184 in the X-ray detection apparatus 104 can implement the following statistic processing. Note, however, that the arrangement having the calculation unit 184 provided in the X-ray detection apparatus 104 is preferably configured to perform the first offset correction and statistic processing for each row read out by the readout circuit 484.

The readout circuit 484 reads out output signals from the photoelectric conversion elements connected to the row driven by the gate driving circuit 482. In this case, the readout circuit 484 also reads out output signals from the photoelectric conversion elements in the ineffective pixel region 402 as well as the photoelectric conversion elements in the effective pixel region 401. That is, the readout circuit 484 reads out output signals from the first pixel group constituted by effective elements and the second pixel group constituted by the light shielded elements 420. The signal conversion circuit 485 converts the output signals read out by the readout circuit 484 into digital pixel values and outputs them. The calculation unit 184 obtains pixel values from each row output from the signal conversion circuit 485. As described above, the first correction unit 181 performs offset correction using an offset image with respect to the pixel values obtained from the signal conversion circuit 485 and saves the pixel values after the correction in the memory unit 170.

Upon starting statistic processing with respect to outputs from a plurality of pixels which are obtained from the light shielded elements 420, the calculation unit 184 obtains pixel values from each row of an image after the first offset correction, which are saved in the memory unit 170 (step S501). The calculation unit 184 saves, in the memory unit 170, pixel values obtained from the light shielded elements 420 of pixel values from each row which are obtained in step S501 (step S502). For example, output signals from photoelectric conversion elements are divided into output signals from the effective elements 421 and output signals from the light shielded elements 420 on the left side and the light shielded elements 420 on the right side. Output signals from the effective elements 421 are used as pixel values at the respective positions and formed into an image. In contrast, the light shielded elements 420 outside the effective pixel region 401 are used to execute the second offset correction.

Figure 6:
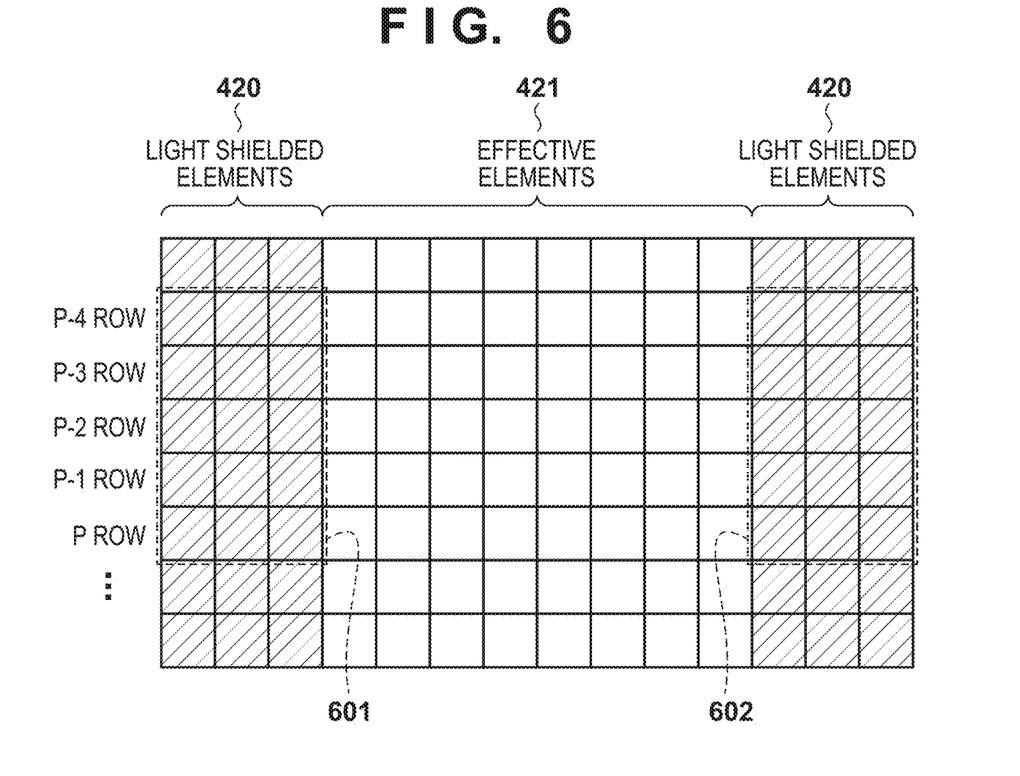
FIG. 6 is a view for explaining statistic processing of pixel values obtained from light shielded elements.

The calculation unit 184 performs the first statistic processing with respect to pixel values obtained from the light shielded elements 420 (step S503). The calculation unit 184 performs the first statistic processing upon dividing the region constituted by the light shielded elements 420 into a plurality of regions. For example, referring to FIG. 6, when P column is read out, the calculation unit 184 extracts horizontal 3 pixels×vertical 5 pixels, that is, a total of 15 pixels (a region 601), from the light shielded elements 420 on the left side on P row, P-1 row, P-2 row, P-3 row, and P-4 row, and calculates a median value. Likewise, the calculation unit 184 calculates a median value concerning 15 pixels in a region 602. The calculation unit 184 saves the obtained statistic values (the median values in this case) as the first statistic values in the memory unit 170 (step S504). The processing in steps S501 to S504 is repeated until the above processing is executed for all the rows in a planned region (step S505). The first statistic processing obtains a plurality of first statistic values concerning the light shielded elements 420 on the left side of the effective pixel region 401 and the light shielded elements 420 on the right side of the effective pixel region 401.

Upon completing the first statistic processing concerning the planned region, the calculation unit 184 performs the second statistic processing with respect to a plurality of first statistic values saved in the memory unit 170 (step S506). In this embodiment, the calculation unit 184 calculates a second statistic value ($A_n$) by performing median processing of the plurality of first statistic values. Performing the second statistic processing can handle problems such as locally excessive increases and decreases in output. Note that the second statistic processing may use a plurality of types of statistic processing. For example, the second statistic processing may be performed to obtain four median values by performing median processing of the first statistic values in four regions, that is, upper, lower, left, and right regions, in the ineffective pixel region 402 shown in FIG. 4 and calculate the statistic value ($A_n$) by performing averaging processing of the four obtained median values.

As shown in FIG. 4, although the upper and lower ineffective pixel regions 402 each do not include the effective pixel region 401 in the center as shown in FIG. 4, statistic processing may be performed by using left and right end regions as in the left and right ineffective pixel regions 402. This eliminates the necessity to change the regions to be used for statistic processing among the upper and lower ineffective pixel regions and the left and right ineffective pixel regions, thereby simplifying calculation processing by the calculation unit 184 and suppressing an increase in the circuit size of the FPGA.

Note that the above description has exemplified median processing as the first statistic processing and the second statistic processing. However, this is not exhaustive. Median processing or mode processing without division is suitable for sequential calculation by the FPGA. However, when, for example, an information processing apparatus including a CPU is used, average values may be used in the first statistic processing and the second statistic processing.

Note that the calculation unit 184 described above performs statistic processing for each row. However, this is not exhaustive. For example, in the first statistic processing, the calculation unit 184 may perform statistic processing with respect to the entire light shielded elements 420 on the left side and the entire light shielded elements 420 on the right side. In this case, more complicated statistic processing such as density ratio estimation may be performed.

Figure 7A:
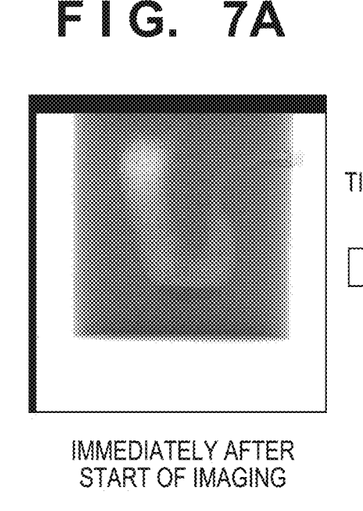
FIGS. 7A and 7B are views showing an example of a deterioration in image quality in X-ray fluoroscopic imaging.
Figure 7B:
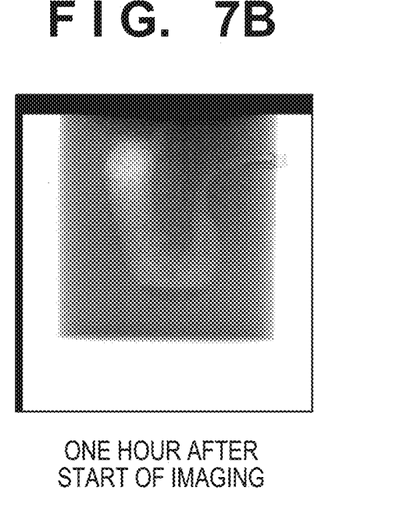

FIG. 7 is a view for explaining a problem that can occur when the second offset correction according to this embodiment is not used. FIG. 7 shows images obtained when stomach fluoroscopy is performed with moving images. The readout circuit 484 of the X-ray detection apparatus 104 includes an amplifier IC that amplifies a signal read out from each photoelectric conversion element. The amplifier IC is a component that tends to generate heat, and is arranged near the photoelectric conversion elements arranged in a matrix pattern (array pattern) in the X-ray detection apparatus 104 to prevent noise from mixing in a signal path before amplification. When, for example, the amplifier IC is arranged near the upper end portion of the imaging sensor 151, the temperature of the upper end portion of the imaging sensor 151 rises. This also causes a great change in pixel value (offset) in a dark image.

FIG. 7A shows a stomach fluoroscopic image immediately after the start of imaging. Before imaging of an object, the first offset image is obtained and saved in the memory unit 170. In a stomach fluoroscopic image, because the elapsed time since the obtaining of the first offset image is short, an offset distribution can be properly corrected without applying the second offset correction at the start of imaging.

FIG. 7B shows a stomach fluoroscopic image one hour after the start of imaging. As the temperature of the imaging sensor 151 rises, pixel values decrease in an upper portion of an image near a component with a high degree of heat generation, such as an amplifier IC. Consequently, when the first correction unit 181 subtracts an offset image obtained in advance from the obtained image (executes offset correction), negative pixel values appear. When pixel values become negative, the pixel values are made uniform by image processing such as negative value clipping, resulting in substantial signal defects. According to this embodiment, the application of the second offset correction described above can reduce image signal defects, thereby solving the problem shown in FIGS. 7A and 7B.

This embodiment has exemplified the case in which the second pixel group from which offset values are also obtained with irradiation with radiation is constituted by the light shielded photoelectric conversion elements (light shielded elements). However, this is not exhaustive. As pixels constituting the second pixel group, elements without photoelectric conversion portions may be used. The optical black pixels according to the embodiment may be pixels with light shielded photoelectric conversion elements or pixels without photoelectric conversion elements (pixels constituted by only capacitors).

Second Embodiment

The second embodiment will be described next. In the second embodiment, the driving method is changed to increase the imaging speed and reduce the exposure dose, thereby more properly correcting an in-plane change in offset caused by temperature and environmental changes. Note that an X-ray imaging apparatus 100 according to the second embodiment has the same arrangement such as that of the first embodiment (FIG. 1). Differences from the first embodiment will be mainly described below.

Figure 8A:
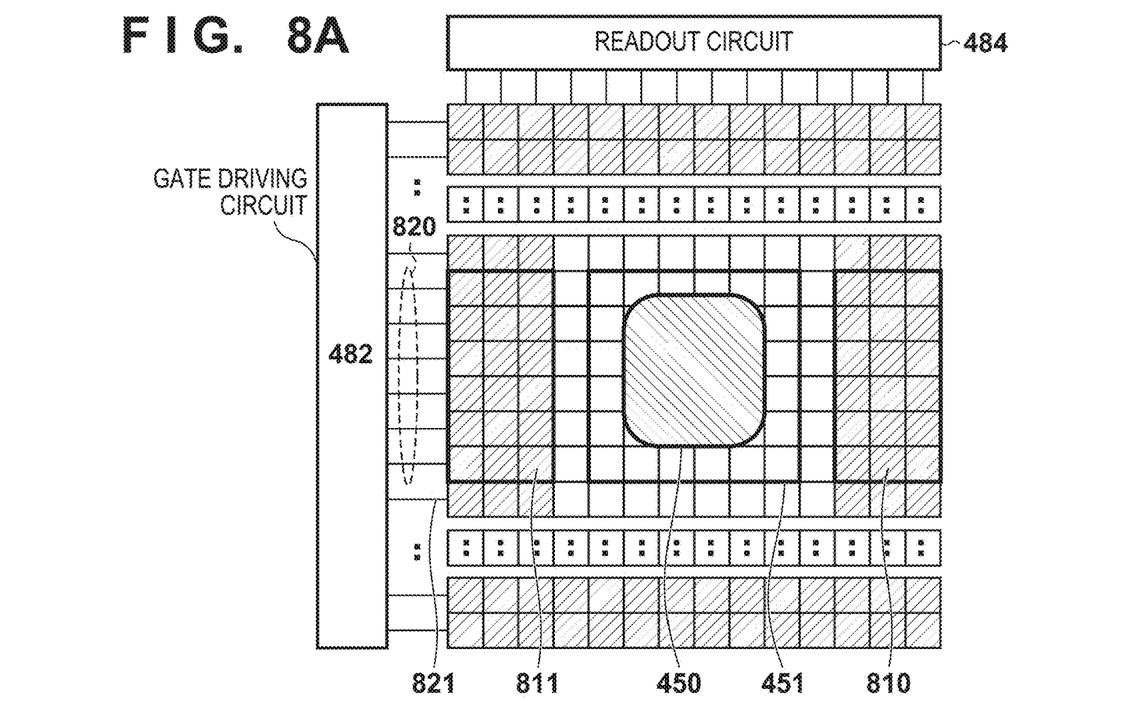
FIGS. 8A to 8C are views for explaining offset correction when imaging is performed with a narrowed-down irradiation field.
Figure 8B:
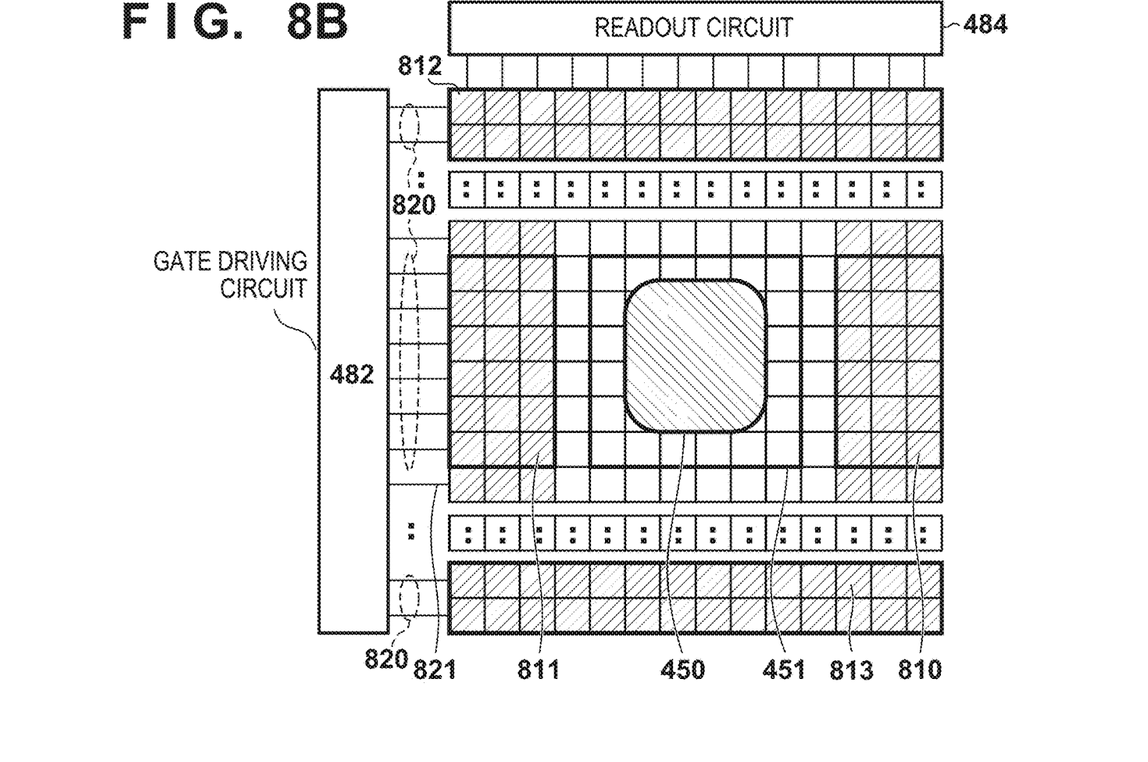
Figure 8C:
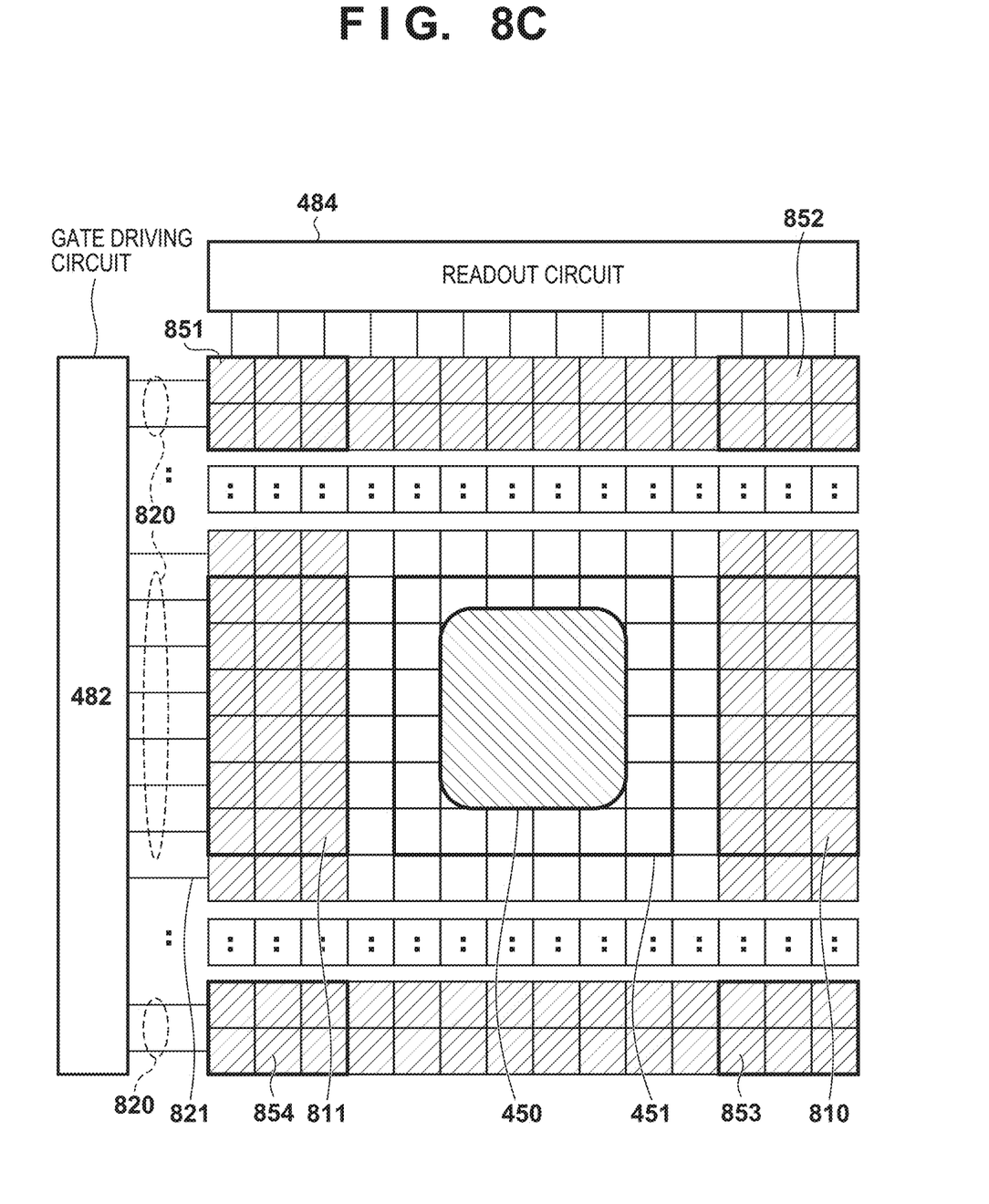

FIGS. 8A to 8C are views for explaining variations of the second offset correction when imaging is performed with a narrowed-down irradiation field. Referring to FIGS. 8A to 8C, an X-ray irradiation range 450 is a range in which radiation is applied from an imaging sensor 151 of an X-ray detection apparatus 104. The user sets a trimming drive range 451 by designating an imaging region as a 9-inch square region, 12-inch square region, or the like via an operation panel 111. When the trimming drive range 451 is set, a gate driving circuit 482 and a readout circuit 484 perform partial readout driving of reading out pixel values by driving a row including the trimming drive range 451. The second embodiment will exemplify the following three cases.

An example of a first driving method will be described first with reference to FIG. 8A. The first driving method performs the second offset correction by using light shielded elements located in a lateral direction of the range driven by the gate driving circuit 482. The gate driving circuit 482 drives gate lines 820 of rows including the designated trimming drive range 451 and does not drive other gate lines 821. A calculation unit 184 performs the first statistic processing and the second statistic processing described above with respect to a right region 810 and a left region 811 constituted by light shielded elements 420 existing on the gate lines driven by the gate driving circuit 482. The first driving method has the merit of increasing the frame rate because the number of gate lines to be driven decreases. In addition, this can reduce the driving change branches based on the trimming drive range 451, thereby simplifying drive control by the FPGA and the like.

The second driving method will be described next with reference to FIG. 8B. Unlike in the first driving method described above, in the second driving method, an upper region 812 and a lower region 813 are added as regions of the light shielded elements 420 used for the second offset correction processing. Accordingly, in the second driving method, the gate driving circuit 482 drives the gate lines on the upper and lower ends of the imaging sensor 151 in addition to the trimming drive range 451. The second driving method has the merit of being able to grasp each side by a uniform method with respect to an end portion where characteristics tend to change, and hence suppressing the occurrence of troubles caused because different methods are used depending on direction.

The third driving method will be described next with reference to FIG. 8C. The third driving method uses partial regions of the upper region 812 and the lower region 813 as the regions of light shielded elements used for offset correction processing in the second driving method. That is, the third driving method uses an upper left region 851, an upper right region 852, a lower right region 853, and a lower left region 854 in addition to the left region 811 and the right region 810. In the third driving method, the width (the number of pixels) of the upper left region 851, the upper right region 852, the lower right region 853, and the lower left region 854 in the row direction is matched with the width of the left region 811 and the right region 810 in the row direction to fix the number of light shielded elements in the row direction in the first statistic processing. Accordingly, as compared with the second driving method, the third driving method has the merit of being able to simplify the calculation performed by the FPGA. In contrast to this, when characteristics are distributed in the lateral direction in FIG. 8C, the second driving method is superior to the third driving method. The third driving method is suitable for a case in which it is obvious from various environmental tests that the readout circuit 484 is the main cause of heat generation and the difference in temperature distribution in the lateral direction is small.

Note that the application of correction values used for the second offset correction is not limited to the correction of image signals. For example, such correction values may be used for the correction of pixel values provided by an ABC/AEC unit 120. Using the pixel values obtained by the second offset correction can improve the control accuracy of ABC/AEC and prevent excessive irradiation and insufficient irradiation accompanying output variation.

The second offset correction applies the first offset correction processing to pixel values from the second pixel group constituted by the light shielded elements 420 and uses the resultant values for the calculation of statistic values (steps S205 and S206). However, this is not exhaustive. The first offset correction is applied to pixel values from the second pixel group to evaluate variations in values from the second pixel group since the obtaining of an offset image used for the first offset correction. That is, the second offset correction is only required to enable processing in steps S302 to S310 based on temporal variations in pixel values obtained from the second pixel group, and is not limited to the use of the result of the first offset correction. For example, "temporal variations in pixel values obtained from the second pixel group" may be obtained from one of dark images repeatedly obtained in steps S201 and S202.

The above embodiment uses pixel values from the light shielded elements 420 existing in the ineffective pixel region 402. However, this is not exhaustive. For example, pixel values from the light shielded elements 420 arranged in the effective pixel region 401 in FIG. 4 may be used for the above calculation of a statistic value.

The X-ray imaging apparatus 100 (the X-ray generation apparatus 101 and the X-ray detection apparatus 104) can be mounted on various types of imaging systems. For example, the X-ray imaging apparatus 100 can be mounted on a head imaging apparatus, a Bucky stand, a top lifting type Bucky table D, and a U-arm Bucky imaging apparatus.

As has been described above, according to each embodiment described above, it is possible to reduce a deterioration in image quality caused by a temporal change in offset component caused during imaging in a radiation imaging apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-045136, filed on 12 Mar. 2019, which is hereby incorporated by reference herein in its entirety.

What is claimed is:

1. An image processing apparatus that processes an image obtained from an imaging sensor having a plurality of pixels arranged in a matrix pattern, the pixels including a first pixel group for obtaining a pixel value corresponding to a radiation dose and a second pixel group for obtaining an offset value even with irradiation with radiation, the apparatus comprising:

a first correction unit configured to perform offset correction of a radiation image obtained from the plurality of pixels by an imaging operation with irradiation with radiation based on a dark image obtained from the plurality of pixels by an imaging operation without irradiation with radiation;

a calculation unit configured to calculate a statistic value of pixel values obtained from the second pixel group of the radiation image corrected by the first correction unit; and a second correction unit configured to correct pixel values obtained from the first pixel group, which are corrected by the first correction unit, based on a temporal variation in the statistic value obtained by the calculation unit.

2. The apparatus according to claim 1, wherein the statistic value includes at least one of an average value, a median value, a mode value, and a top % value of pixel values obtained from the second pixel group.

3. The apparatus according to claim 1, wherein the calculation unit performs recursive processing of obtaining a statistic value used by the second correction unit by integrating a statistic value obtained before previous radiation imaging and a statistic value obtained by current radiation imaging by calculation using weighting.

4. The apparatus according to claim 3, wherein the calculation unit changes a weight value of the weighting based on an elapsed time since obtaining of an image for offset correction by the first correction unit.

5. The apparatus according to claim 1, wherein the second correction unit performs correction so as to increase pixel values obtained from the first pixel group.

6. The apparatus according to claim 5, wherein the second correction unit adds an absolute value of the statistic value to pixel values obtained from the first pixel group from which the statistic value is obtained.

7. The apparatus according to claim 5, wherein the second correction unit subtracts, if the statistic value is larger than a positive threshold, the positive threshold from a pixel value obtained from the first pixel group, and adds, if the statistic value is smaller than a negative threshold, an absolute value of the negative threshold to a pixel value obtained from the first pixel group.

8. The apparatus according to claim 1, further comprising a determination unit configured to determine whether to execute correction by the second correction unit.

9. The apparatus according to claim 8, wherein the determination unit determines to execute correction by the second correction unit if an elapsed time since obtaining of an image for offset correction by the first correction unit exceeds a predetermined value.

10. The apparatus according to claim 8, wherein the determination unit determines to execute correction by the second correction unit if the statistic value is smaller than a predetermined threshold.

11. The apparatus according to claim 8, wherein the second correction unit executes, if an absolute value of the statistic value is larger than a predetermined threshold, correction by using the predetermined threshold, and executes correction by using the statistic value if the absolute value of the statistic value is not more than the predetermined threshold.

12. The apparatus according to claim 1, wherein the calculation unit calculates a statistic value for each region of the first pixel group and calculates the statistic value based on the statistic value for the each region.

13. A radiation imaging apparatus comprising:
an imaging sensor having a plurality of pixels arranged in a matrix pattern, the pixels including a first pixel group for obtaining a pixel value corresponding to a radiation dose and a second pixel group for obtaining an offset value even with irradiation with radiation; and
an image processing apparatus configured to process an image obtained from the imaging sensor,
wherein the image processing apparatus includes
a first correction unit configured to perform offset correction of a radiation image obtained from the plurality of pixels by an imaging operation with irradiation with radiation based on a dark image obtained from the plurality of pixels by an imaging operation without irradiation with radiation,
a calculation unit configured to calculate a statistic value of pixel values obtained from the second pixel group of the radiation image corrected by the first correction unit, and
a second correction unit configured to correct pixel values obtained from the first pixel group, which are corrected by the first correction unit, based on a temporal variation in the statistic value obtained by the calculation unit.

14. The apparatus according to claim 13, wherein the first pixel group includes a plurality of photoelectric conversion elements arranged in a matrix pattern in an effective pixel region, and
the second pixel group includes a plurality of photoelectric conversion elements arranged around the effective pixel region and covered by a light shielding member.

15. The apparatus according to claim 14, further comprising a driving unit configured to perform partial readout driving by using part of the effective pixel region,
wherein the driving unit provides the calculation unit with a pixel value from a pixel group, of the second pixel group, which is arranged on rows including a region read out in the partial readout driving.

16. An image processing method for processing an image obtained from an imaging sensor having a plurality of pixels arranged in a matrix pattern, the pixels including a first pixel group for obtaining a pixel value corresponding to a radiation dose and a second pixel group for obtaining an offset value even with irradiation with radiation, the method comprising:
executing first correction processing of performing offset correction of a radiation image obtained from the plurality of pixels by an imaging operation with irradiation with radiation by using an offset image based on a dark image obtained from the plurality of pixels by an imaging operation without irradiation with radiation;
calculating a statistic value of pixel values obtained from the second pixel group of the radiation image corrected by the first correction processing; and
executing second correction processing of correcting pixel values obtained from the first pixel group, corrected by the first correction, based on a temporal variation in the statistic value.

17. A non-transitory computer-readable storage medium storing a program for causing a computer to execute an image processing method according to claim 16.

* * * * *